(12) United States Patent
Hall et al.

(10) Patent No.: US 9,405,556 B2
(45) Date of Patent: Aug. 2, 2016

(54) DYNAMIC ADDITION AND REMOVAL OF OPERATING SYSTEM COMPONENTS

(75) Inventors: Michael Hall, Snohomish, WA (US); Jeremiah Spradlin, Seattle, WA (US); Andrew Lovitt, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 198 days.

(21) Appl. No.: 13/535,599

(22) Filed: Jun. 28, 2012
(Under 37 CFR 1.47)

(65) Prior Publication Data
US 2014/0007140 A1     Jan. 2, 2014

(51) Int. Cl.
*G06F 9/44* (2006.01)
*G06F 9/445* (2006.01)

(52) U.S. Cl.
CPC .......... *G06F 9/4443* (2013.01); *G06F 9/44505* (2013.01)

(58) Field of Classification Search
None
See application file for complete search history.

(56) References Cited

U.S. PATENT DOCUMENTS

| | | | |
|---|---|---|---|
| 5,537,548 A | 7/1996 | Fin et al. | |
| 7,505,995 B2 | 3/2009 | Grealish et al. | |
| 7,752,601 B1 | 7/2010 | York | |
| 7,783,727 B1 | 8/2010 | Foley et al. | |
| 7,830,388 B1 | 11/2010 | Lu | |
| 8,069,487 B2* | 11/2011 | Fanton et al. | 726/27 |
| 8,539,515 B1 | 9/2013 | Protassov et al. | |
| 2002/0082717 A1 | 6/2002 | Hellberg et al. | |
| 2002/0120696 A1 | 8/2002 | Mousseau et al. | |
| 2002/0154214 A1 | 10/2002 | Scallie et al. | |
| 2003/0061279 A1 | 3/2003 | Llewellyn et al. | |
| 2004/0237071 A1 | 11/2004 | Hollander et al. | |
| 2005/0021762 A1 | 1/2005 | Gbadegesin | |
| 2005/0160414 A1 | 7/2005 | Parnanen et al. | |
| 2006/0036570 A1* | 2/2006 | Schaefer et al. | 707/1 |
| 2006/0265714 A1 | 11/2006 | Bissett et al. | |
| 2008/0034363 A1* | 2/2008 | Jones | 717/174 |

(Continued)

OTHER PUBLICATIONS

"How to Add or Remove Operating System features in Windows 7", Retrieved on: Nov. 30, 2011, Available at: http://microcentertechsupport.blogspot.com/2011/04/how-to-add-or-remove-operating-system-tem.html.

(Continued)

*Primary Examiner* — H S Sough
*Assistant Examiner* — Abdou Seye
(74) *Attorney, Agent, or Firm* — John Jardine; Judy Yee; Micky Minhas

(57) ABSTRACT

Systems, computer program products and computer program products for facilitating the dynamic addition and removal of operating system components on computing devices based on application or user interaction over time are disclosed. Such systems, computer program products and computer program products provide one or more API intercept layers, a rules engine and a hydrate engine that facilitates the ability to dynamically rehydrate or hydrate operating system components. In an embodiment, a minimal (or core) operating system image on a computing device is deployed. Then, required components may be dynamically added (i.e., "streamed" or "rehydrated") from storage, a server or cloud service as required by an executing application program on the computing device. In another embodiment, a totally complete operating system image is deployed on a computing device. Then, unused components may be dynamically removed (i.e., "dehydrated") from the computing device over time based on application or user interaction.

20 Claims, 6 Drawing Sheets

(56) References Cited

U.S. PATENT DOCUMENTS

| | | |
|---|---|---|
| 2009/0271776 A1 | 10/2009 | Schreier et al. |
| 2009/0328080 A1 | 12/2009 | Margarint et al. |
| 2010/0064299 A1 | 3/2010 | Kacin et al. |
| 2010/0229110 A1 | 9/2010 | Rockey et al. |
| 2010/0242106 A1 | 9/2010 | Harris et al. |
| 2010/0251340 A1 | 9/2010 | Martin et al. |
| 2010/0318665 A1 | 12/2010 | Demmer et al. |
| 2011/0071997 A1 | 3/2011 | Sullivan et al. |
| 2011/0093941 A1 | 4/2011 | Liu et al. |
| 2011/0131330 A1 | 6/2011 | Beaty et al. |
| 2011/0145842 A1 | 6/2011 | Tofighbakhsh et al. |
| 2011/0173155 A1 | 7/2011 | Becchi et al. |
| 2011/0179260 A1 | 7/2011 | Dong et al. |
| 2011/0252318 A1 | 10/2011 | Helms |
| 2011/0271270 A1* | 11/2011 | Bowen .......................... 717/171 |
| 2011/0307890 A1 | 12/2011 | Achilles et al. |
| 2013/0173894 A1 | 7/2013 | Yan et al. |

OTHER PUBLICATIONS

International Search Report & Written Opinion for PCT Patent Application No. PCT/US2013/046207, Mailed Date: Dec. 10, 2013, Filed Date: Jun. 18, 2013, 8 pages.

International Search Report & Written Opinion for PCT Patent Application No. PCT/US2013/047218, Mailed Date: Aug. 28, 2013, Filed Date: Jun. 24, 2013, 10 Pages.

"API Interception via DLL Redirection", Published on: Nov. 20, 2010, Available at: http://www.ic0de.org/archive/index.phh/t-9939.html, 1 page.

* cited by examiner

DYNAMIC ADDITION AND REMOVAL OF OPERATING SYSTEM COMPONENTS

CROSS REFERENCE TO RELATED APPLICATION

This Application is related to co-owned, co-pending U.S. patent application Ser. No. 13/531,116, titled "API Redirection for Limited Capability Operating Systems," filed on Jun. 22, 2012, which is hereby incorporated by reference as to its entire contents.

FIELD OF THE INVENTION

The present disclosure generally relates to computer operating systems and more particularly to systems, methods and computer program products for facilitating the installation and removal of operating systems components on computing devices.

BACKGROUND

In today's technological environment, it is common for an operating system—the low-level software that manages the interface to a computing device's hardware, schedules tasks, allocates storage, and generally provides common services for application software executing on the computer—to be built and deployed with fixed and well-defined features such as an application program interface (API) to support a range of customer requirements. That is, the operating system's API provides an interface (i.e., a set of calling conventions) by which application programs access the operating system and other services on a particular computing device (e.g., server, desktop, laptop, notebook, tablet computer, personal digital assistant (PDA), mobile telephone, smart telephone and the like). The fixed API surface of an operating system deployed in a computing device offers application developers a fixed set of binary features (e.g., executables, shared libraries such as dynamically-loaded libraries, and the like). For example, the Windows® 7 operating system (available from Microsoft Corporation of Redmond, Wash.) provides the "Windows Software Development Kit (SDK)" API which gives application developers a fixed and well-known API surface with which to develop application programs.

Operating systems are typically burned into the memory (e.g., ROM, Flash, HDD, SSD, etc.) of a mobile, desktop or embedded computing device in a configuration that meets the general purpose needs of the device. Despite being conventionally shipped as pre-built images, the operating system may include features or API components that are never used by client applications executing on the particular computing device platform. For fixed function devices or devices that run in a regulated environment (e.g., gaming, medical, financial, military and like environments), these features should not exist in the device hardware as shipped. In these instances, the unused (or not required) features or API components waste memory on the computing device, and potentially exposes the device to malicious attack because such features are still installed and potentially operational on the device. Conversely, a user may need to run an application that relies on a set of operating system features/frameworks that were not included in a specific version (i.e., SKU) of the operating system shipped with the computing device. Thus, if an operating system component which normally handles a particular API call does not exist within the particular operating system implementation, the execution of an application will produce a run-time error and fail.

SUMMARY

This summary is provided to introduce a selection of concepts. These concepts are further described below in the Detailed Description section. This summary is not intended to identify key features or essential features of the claimed subject matter, nor is this summary intended as an aid in determining the scope of the claimed subject matter.

Embodiments of the present disclosure meet the above-identified needs by providing systems, methods and computer program products that facilitate the dynamic addition and removal of operating system components on computing devices based on application or user interaction over time. Such systems, methods and computer program products include one or more API intercept layers, a rules engine and a dehydrate/hydrate engine that facilitates the ability to dynamically dehydrate/rehydrate or hydrate operating system components.

Embodiments of the present disclosure include technologies that facilitate the deployment of a minimal (or core) operating system image on a computing device. Then, required components may be dynamically added (i.e., "streamed" or "rehydrated") from local storage, a network server or a cloud service (i.e., the delivery of a computing resource as a service rather than a product, whereby shared resources, software, and information are provided to computers and other devices as a metered service over a network—typically the global, public Internet) as required by an application program executing on the computing device.

Embodiments of the present disclosure include technologies that facilitate the deployment of a totally complete operating system image on a computing device. Then, unused operating system components may be dynamically removed (i.e., "dehydrated") from the computing device over time based on application or user interaction with the computing device.

Further features and advantages of the present disclosure, as well as the structure and operation of various aspects of the present disclosure, are described in detail below with reference to the accompanying drawings.

BRIEF DESCRIPTION OF THE DRAWINGS

The features and advantages of the present disclosure will become more apparent from the detailed description set forth below when taken in conjunction with the drawings in which like reference numbers indicate identical or functionally similar elements.

DETAILED DESCRIPTION

Figure 1:
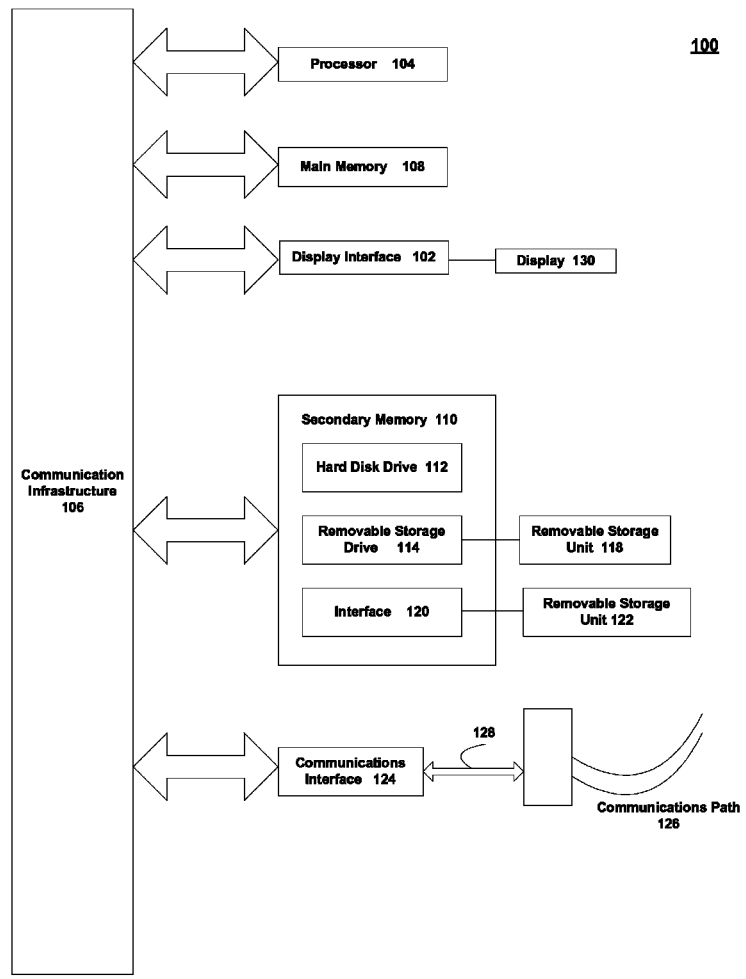
FIG. 1 is a block diagram of an exemplary computer system useful for implementing an embodiment of the present disclosure.

The present disclosure is directed to systems, methods and computer program products for facilitating the dynamic addition and removal of operating system ("O/S") components on computing devices based on application or user interaction over time.

Operating systems expose an API surface through a series of applications and dynamically-loaded libraries. A single library might expose a series of API calls which may be used by one or more applications executing on a computing device. Operating systems, such as Mac OS® and iPhone® available from Apple, Inc. of Cupertino, Calif., Windows® and Windows® Phone available from available from Microsoft Corporation of Redmond, Wash. and Android™ available from Google, Inc. of Mountain View, Calif., all ship with a well-defined set of operating system components and a consistent API surface to ensure application compatibility across platforms. Application developers create software applications that use a subset of the complete operating system API surface, and therefore a subset of the operating system functionality. This utilized subset maps to a set of O/S features/technologies/components within the operating system.

In an embodiment of the present disclosure, a totally complete operating system image is deployed on a computing device such that unused (and thus, unnecessary) components may be dynamically removed (i.e., "dehydrated") from the computing device over time based on application or user interaction. In such an embodiment, a developer would write an application to run on an operating system, and the operating system and application are deployed. As the application executes, the API call (feature) usage is monitored. Any features not used by the application are then removed over time. As a result, a reduced operating system image becomes simpler to service, and exposes less of an attack surface than a full operating system image.

In an alternate embodiment of the present disclosure, a minimal (or core) operating system image is deployed on a computing device such that required components may be dynamically added (i.e., "streamed" or "rehydrated") from a local storage, a network server or a cloud service as required by an application program executing on the computing device. That is, in such an embodiment, an operating system ships with the minimal set of services (e.g., kernel, file system, memory manager, driver host, and systems for starting/stopping applications). Yet, an application developer writes an application based on a "full" operating system SDK, and the application is then deployed to the minimal operating system image. As the application executes, an API/Feature intercept layer "catches" the API call, determines that the appropriate operating system component does not exist within the computing system, and then causes the component/feature to be rehydrated. In alternate embodiments, this rehydration may come from a number of sources (e.g., local/staged media, network service, or a cloud service). Over time, the operating system components match the requirements of the running application. As a result, the operating system servicing model is simplified (i.e., less components to service), exposes less of an attack surface than a full operating system image, and is potentially easier to deploy over a network to multiple computing devices.

In one embodiment, the present disclosure is directed toward one or more computer systems or computing devices capable of carrying out the functionality of the embodiments described herein. An example of a computer system 100 is shown in FIG. 1.

Computer system 100 includes one or more processors, such as processor 104. The processor 104 is connected to a communication infrastructure 106 (e.g., a communications bus or network). Various software aspects are described in terms of this exemplary computer system. After reading this description, it will become apparent to a person skilled in the relevant art(s) how to implement the disclosure using other computer systems and/or architectures.

Computer system 100 may include a display interface 102 that forwards graphics, text and other data from the communication infrastructure 106 (or from a frame buffer not shown) for display on the display unit 130.

Computer system 100 also includes a main memory 108, preferably random access memory (RAM) and may also include a secondary memory 110. The secondary memory 110 may include, for example, a hard disk drive 112 and/or a removable storage drive 114, representing a floppy disk drive, a magnetic tape drive, an optical disk drive, etc. The removable storage drive 114 reads from and/or writes to a removable storage unit 118 in a well known manner. Removable storage unit 118 represents a floppy disk, magnetic tape, optical disk, etc. which is read by and written to by removable storage drive 114. As will be appreciated, the removable storage unit 118 includes a computer usable storage medium having stored therein computer software and/or data.

In alternative aspects, secondary memory 110 may include other similar devices for allowing computer programs or other code or instructions to be loaded into computer system 100. Such devices may include, for example, a removable storage unit 122 and an interface 120. Examples of such may include a program cartridge and cartridge interface (such as that found in video game devices), a removable memory chip (such as an erasable programmable read only memory (EPROM), or programmable read only memory (PROM)) and associated socket and other removable storage units 122 and interfaces 120, which allow software and data to be transferred from the removable storage unit 122 to computer system 100.

Computer system 100 may also include a communications interface 124. Communications interface 124 allows software and data to be transferred between computer system 100 and external devices. Examples of communications interface 124 may include a modem, a network interface (such as an Ethernet card), a communications port, a Personal Computer Memory Card International Association (PCMCIA) slot and card, etc. Software and data transferred via communications interface 124 are in the form of signals 128 which may be electronic, electromagnetic, optical or other signals capable of being received by communications interface 124. These signals 128 are provided to communications interface 124 via a communications path (e.g., channel) 126. This channel 126 carries signals 128 and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 114, a hard disk installed in hard disk drive 112 and signals 128. These computer program products provide software to computer system 100. The disclosure is directed to such computer program products.

Computer programs (also referred to as computer control logic) are stored in main memory 108 and/or secondary memory 110. Computer programs may also be received via communications interface 124. Such computer programs, when executed, enable the computer system 100 to perform the features of the present disclosure, as discussed herein. In particular, the computer programs, when executed, enable the processor 104 to perform the features of the present disclosure. Accordingly, such computer programs represent controllers of the computer system 100.

In an embodiment where the disclosure is implemented using software, the software may be stored in a computer program product and loaded into computer system 100 using removable storage drive 114, hard drive 112 or communications interface 124. The control logic (software), when executed by the processor 104, causes the processor 104 to perform the functions of the disclosure as described herein.

In another embodiment, the disclosure is implemented primarily in hardware using, for example, hardware components such as application specific integrated circuits (ASICs). Implementation of the hardware state machine so as to perform the functions described herein will be apparent to persons skilled in the relevant art(s).

As will be apparent to one skilled in the relevant art(s) after reading the description herein, the computer architecture shown in FIG. 1 may be configured as any number of computing devices such as a game console, a portable media player, a desktop, a laptop, a server, a notebook computer, a tablet computer, a PDA, a mobile computer, a smart telephone, a mobile telephone, an intelligent communications device or the like.

In yet another embodiment, the disclosure is implemented using a combination of both hardware and software.

Figure 2:
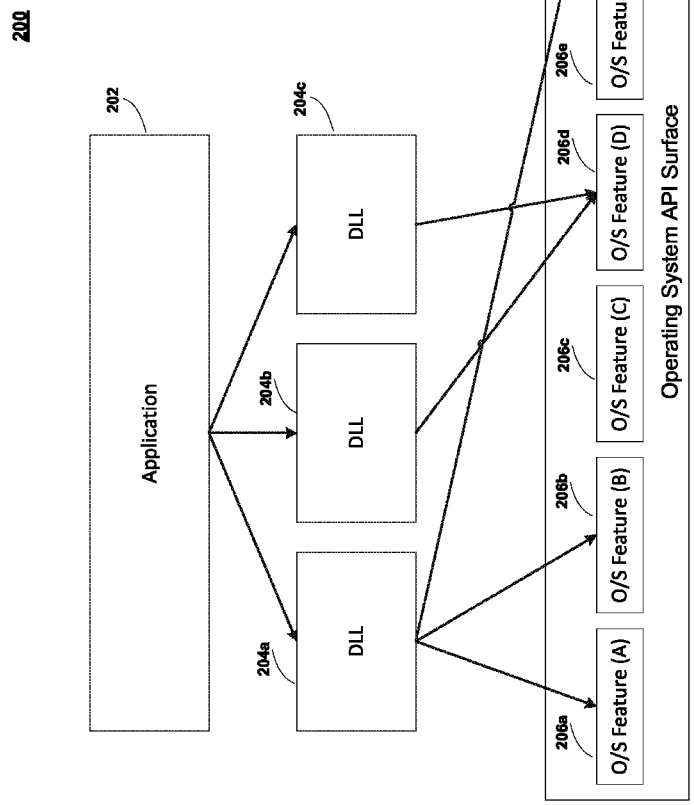
FIG. 2 is a block diagram illustrating a conventional operating system implementation environment.

Referring to FIG. 2, a block diagram is shown that illustrates an operating system implementation environment 200 utilized by many conventional computing systems. As will be appreciated by those skilled in the relevant art(s) after reading the description herein, environment 200 would exist on computing device 100 where a computer program (software) application 202 is executing.

As is well known to those skilled in the relevant art(s), as application 202 executes within environment 200, it may utilize one or more of the operating system's shared library files. In an example where computing device 100 uses the Windows® operating system available from Microsoft Corporation of Redmond, Wash., such shared library files are dynamic-link library files (DLLs) (shown as DLLs 204a-c in FIG. 2). In turn, DLLs 204a-c may utilize one or more operating system components (shown as O/S Service (A)-(F) in FIG. 2) 206 as application 202 executes. In this configuration, certain API calls that use certain features from operating system components are not being made (i.e., O/S Service (C) 206c and O/S Service (D) 206d). In an embodiment, these O/S components/features 206 are candidates for dehydration as described herein below.

Figure 3:
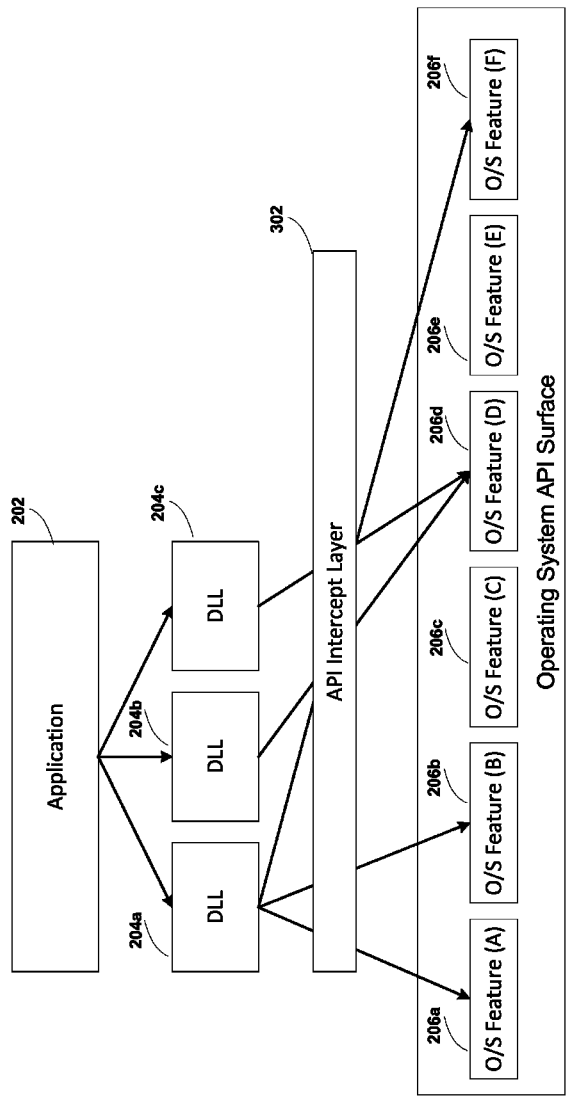
FIGS. 3-5 are block diagrams illustrating various operating system implementation environments according to embodiments of the present disclosure.

Referring now to FIG. 3, a block diagram illustrating an operating system implementation environment 300 according to an embodiment of the present disclosure is shown. In such an embodiment, the situation where certain unutilized features of the operating system remain installed on computing device 100 is overcome by environment 300, which includes an API intercept layer 302 that facilitates the ability to make dynamic operating system component dehydration/rehydration decisions on computing device 100. That is, API intercept layer 302 intercepts API/module/feature calls and logs and stores "touches" (i.e., usage of API calls, services, drivers or resources) of O/S components 206. In an embodiment of the present disclosure, the information captured and stored by API intercept layer 302 facilitates a rules engine (not shown in FIG. 3) that determines when components/features 306 are to be removed from the operating system on computing device 100. Such a rules engine may include a management function to disable hardware components, shutdown services, and remove binary (and other) files of the O/S accordingly. In the example illustrated by environment 300, O/S Service (C) 206c and O/S Service (E) 206e may be removed from computing device 100. As will be appreciated by those skilled in the relevant art(s) after reading the description herein, the operating system within environment 300 may be a multi-layer operating system where API intercept layer 302 may function at one or more of the layers to intercept certain API calls as application 202 executes on computing device 100.

Figure 4:
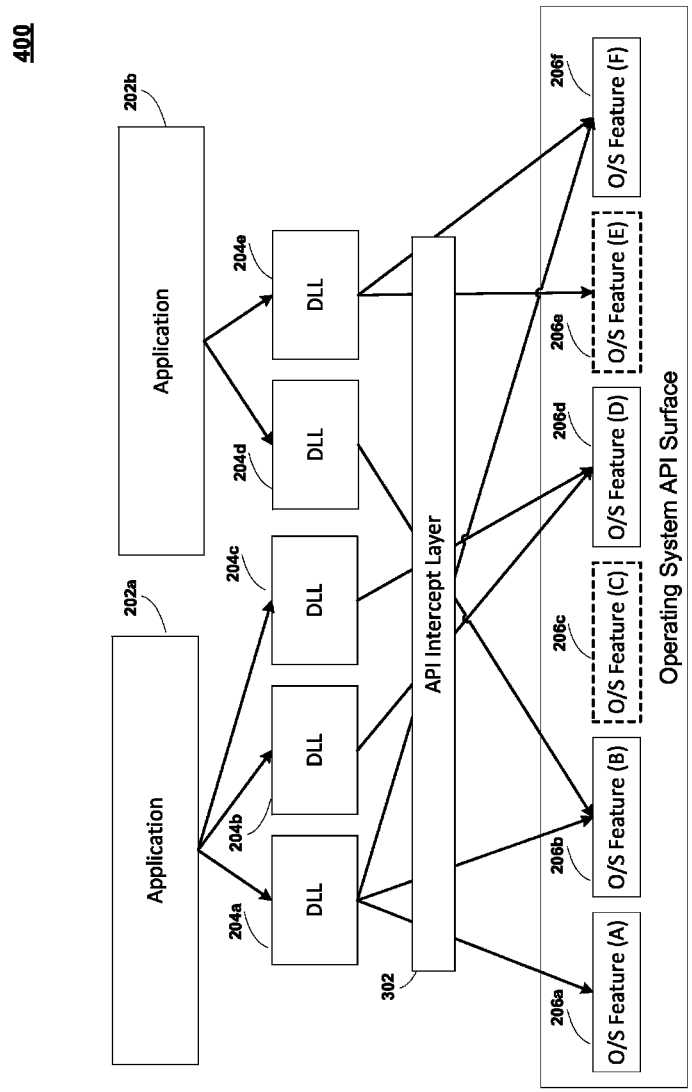

Referring now to FIG. 4, a block diagram illustrating an operating system implementation environment 400 according to an embodiment of the present disclosure is shown. In such an embodiment, environment 400 includes API intercept layer 302, executing applications 202a, 202b which may utilize DLLs 204a-e which in turn may need to utilize operating system component 206a-f. As indicated by the dotted lines in FIG. 4, O/S Service (E) 206e (and O/S Service (C) 206c), however, may have been previously dehydrated (or never hydrated as part of the O/S that shipped with device 100) which would normally result in application 202b producing a run-time error and failing. In such an embodiment, feature/component 206e that supports the API call made by application 202b will need to be retrieved from (local, network or cloud) storage and be rehydrated. (As will be appreciated by those skilled in the relevant art(s) after reading the description herein, as a specific component 206 is rehydrated, other related components 206 of the O/S may also need to be modified to support such installation.)

In an embodiment, as will also be appreciated by those skilled in the relevant art(s) after reading the description herein, O/S Service (E) 206e may have been dehydrated by the rules engine based on its non-usage by application 202a if it was the sole application executing on device 100. Thus, when application 2020b is later installed and executed on device 100, O/S Service (E) 206e would need to be rehydrated in a manner described herein.

Figure 5:
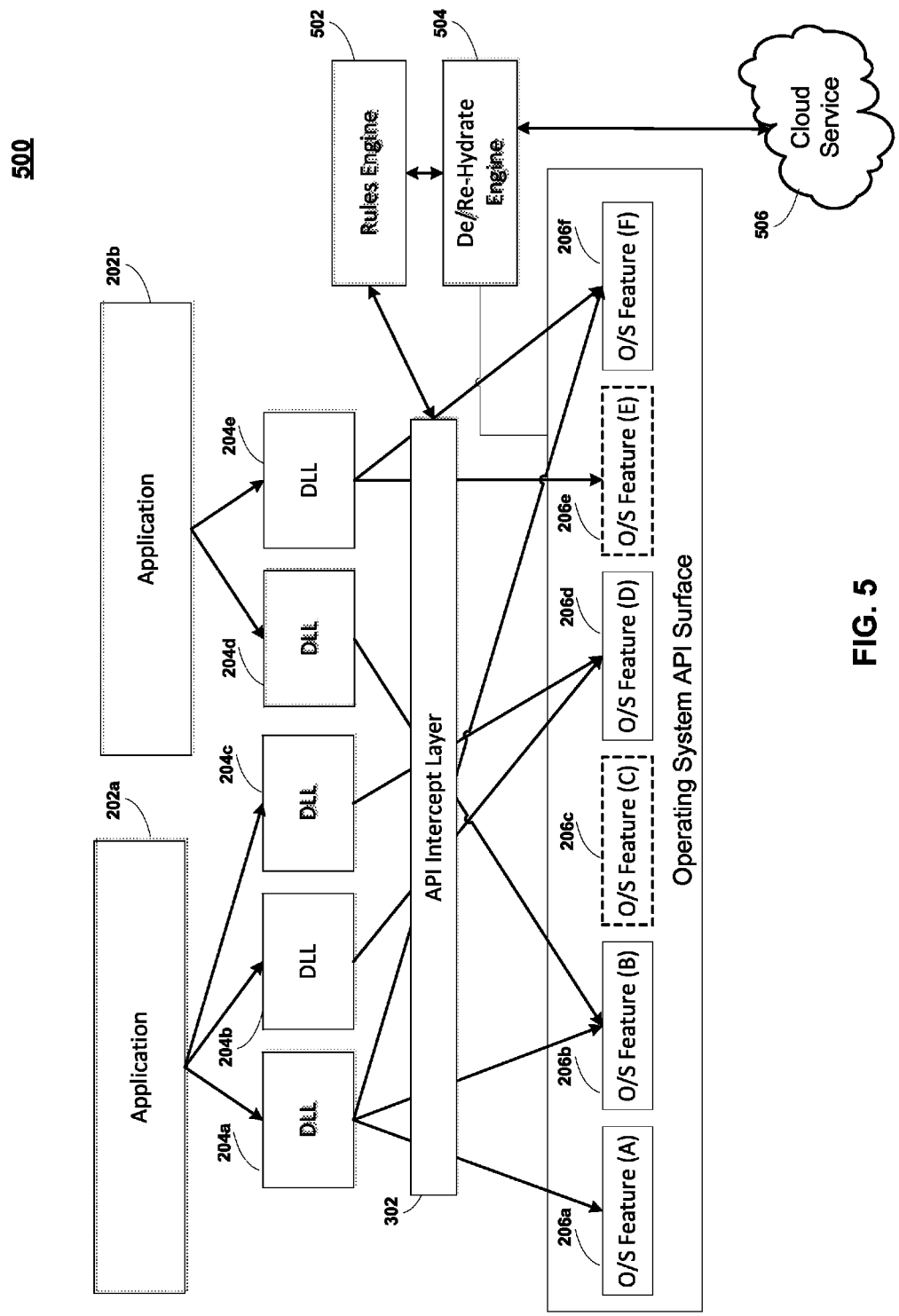

Referring now to FIG. 5, a block diagram illustrating an operating system implementation environment 500 according to an embodiment of the present disclosure is shown. In such an embodiment, environment 500 includes API intercept layer 302, executing applications 202a, 202b, a rules engine 502, a rehydration/dehydration (collectively, "hydrate") engine 504 and a cloud service 506. To illustrate this point, assume executing applications 202a, 202b utilize DLLs 204a-e, which in turn may need to utilize operating system components 206a-f. As indicated by the dotted lines in FIG. 5, O/S Service (E) 206e (and O/S Service (C) 206c), however, may have been previously dehydrated (or never hydrated as part of the O/S that shipped with device 100) which would normally result in application 202b producing a run-time error and failing. In such an embodiment, rules engine 502 comprises control logic to determine API/service/resource/driver/feature/component 206e that supports the API call made by application 202b will need to be rehydrated. In turn, control logic within hydrate engine 504, under the direction of rules engine 502, retrieves component 206e from cloud storage 506 so that application 202b does not produce a run-time error and fail.

As will be appreciated by those skilled in the relevant art(s) after reading the description herein, rules engine 502 may include a table (or other data structure) of rehydration/dehydration (collectively, "hydrate") rules within operating system environment 500 which uses information logged (stored) by API intercept layer 302 to direct hydrate engine 504 to dynamically dehydrate/rehydrate one or more components 206. In an embodiment, rules engine 502 would use one or more classes of dehydration rules either pre-determined/defined by the manufacturer of device 100, or extended/overridden through policies later configured by a system administrator. For example, a simple rule might be to remove all features 206 that are not touched by an application 202 after a certain time period (e.g., one hour, one day, one year, etc.) of application execution. Another example may be based on the mark and sweep garbage collector model supported by the .NET Compact Framework (available from Microsoft Corporation of Redmond, Wash.): over time components are marked as "dirty" (i.e., not used), and a periodic sweep of the O/S will periodically remove any unused components 206. The reverse of this is also possible: start by marking all components as dirty/unused, and as components/features/API calls are used, then mark them as "clean." Then, periodically sweep/remove components 206 that are dirty. In alternate embodiment, the sweep may be a one-time execution model, may be scheduled to run periodically, or may be dynamic based on direct usage of features.

As will be appreciated by those skilled in the relevant art(s) after reading the description herein, rehydration rules are simpler. That is, an application 202 touching a specific API, service, driver, or other technology component 206 would initiate the rehydration of that technology. In an embodiment, however, it is possible to subject rehydration to rules/policies (e.g., do not rehydrate under certain conditions). For example, rules engine 502 may direct hydrate engine 504 not to rehydrate a component 206 until the $n^{th}$ time an application 202 actually needs such component (i.e., the application's need for such component may be redirected to a cloud service 506 rather than actually installing it on device 100 if the $n^{th}$ instance has not yet occurred). In any event, such rehydration rules—like dehydration—may either be pre-determined/defined by the manufacturer of device 100, or extended/overridden through policies later configured by a system administrator.

As will be apparent to one skilled in the relevant art(s) after reading the description herein, in an embodiment, API intercept layer 302, rules engine 502, and hydrate engine 504 may collectively operate to both dehydrate and rehydrate different O/S components 206 at the same time on computing device 100. Further, one skilled in the relevant art(s) after reading the description herein will appreciate that the operating system's shared library files (e.g., DLLs 204) may be the O/S components that API intercept layer 302, rules engine 502, and hydrate engine 504 collectively operate to dehydrate and rehydrate.

As will also be apparent to one skilled in the relevant art(s) after reading the description herein, API intercept layer 302, rules engine 502 and hydrate engine 504 that facilitate the ability to dynamically install and remove operating systems components may be part of the "standard" operating system that ships with a computing device 100 or may be later added to an existing operating system as part of an update (or patch).

Figure 6:
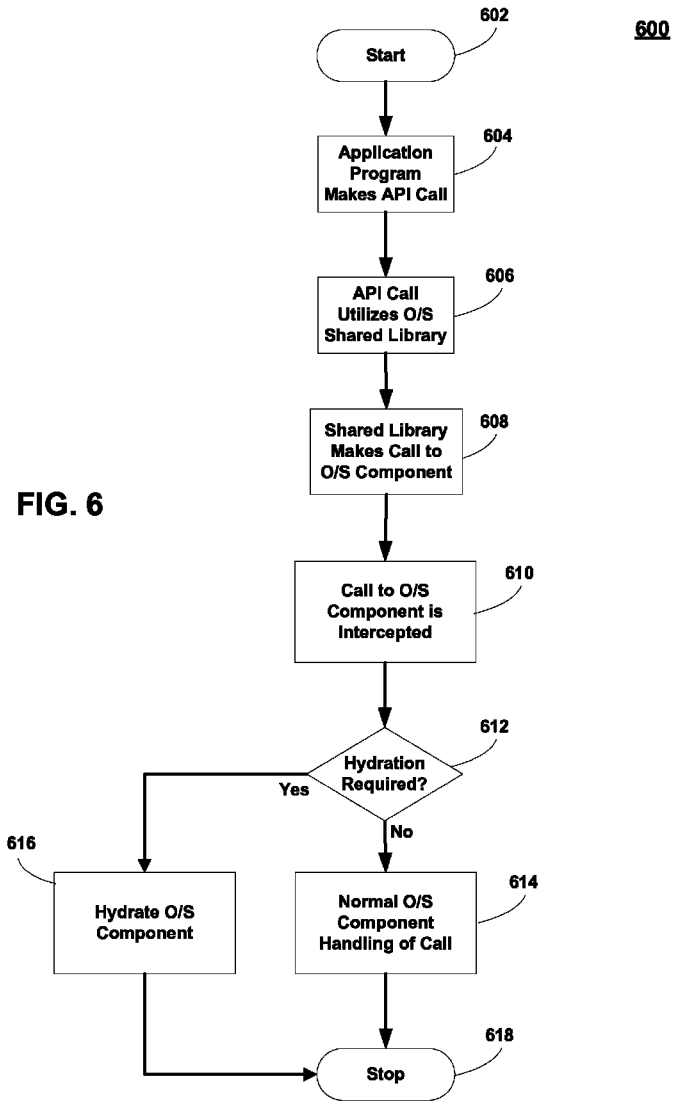
FIG. 6 is a flowchart illustrating a dynamic operating system component hydration process according to an embodiment of the present disclosure.

Referring to FIG. 6, a flowchart illustrating a dynamic operating system component hydration process 600, according to an embodiment of the present disclosure, is shown. Process 600, which would execute within computing device 100, begins at step 602 with control passing immediately to step 604.

In step 604, an application program 202 executing within environments 300, 400 or 500, makes an API call.

In step 606, the API call utilizes a DLL 204, which in step 608 makes a call that is intended for an operating system component 206. In step 610, however, API intercept layer 302 intercepts the call. Then, in step 612, rules engine 502 determines if the call made by DLL 204 is intended for an operating system component 206 that may have been previously dehydrated (or never hydrated as part of the O/S that shipped with device 100), which would normally result in application 202b producing a run-time error and failing.

If the determination of step 612 is negative, process 600 proceeds to step 614. In step 614, the intended O/S component 206 handles the call as normal.

If the determination of step 612 is positive, however, process 600 proceeds to step 616. In step 616, hydrate engine 504, under the direction of rules engine 502 applying at least one hydrate rule, retrieves the O/S component 206 from one of a number of sources (e.g., local/staged media, network service, or a cloud service 506) so that application 202 does not produce a run-time error and fail.

Process 600, which facilitates the dynamic installation and removal of operating systems components on computing devices, then terminates as indicated by step 618.

In various embodiments of the present disclosure, as will be appreciated by those skilled in the relevant art(s) after reading the description herein, the determination by rules engine 502 of what components 206 to dehydrate/rehydrate, via instructions to hydrate engine 504, may be accomplished at least at three different levels:

First, at the simplest level, the determination of what components 206 to dehydrate/rehydrate may be done simply by mapping API call usage to the appropriate library 204, via API intercept layer 206 (e.g., the GetOpenFileName API call maps to Commdlg32.dll DLL in the Windows® O/S).

Second, a level down from the first (i.e., API/library) model mentioned above, is to think about the operating system as a series of interrelated services/components/technologies 206. Thus, the operating system dependencies may be mapped so that the aging/dehydrating determinations about other parts of the operating system component tree made by rules engine 502 based on API usage can be made more intelligently. For example, the Windows® O/S supports a number of optional components (e.g., the Internet Information Server (IIS) component that supports sub-features such as FTP). Each layer of these optional components exposes (internally, or externally) an API surface that can be used to determine whether this feature should be removed/added by hydrate engine 504.

Third, rules engine 502 may determine what components 206 to dehydrate/rehydrate based on subdividing certain operating system technologies. That is, an operating system may expose tens of thousands of API calls where there is a many-to-one relationship between API calls and host services (e.g., the API surface of ADVAPI32.dll on Windows® 7 O/S). Mapping API usage to host services and removing at the "bulk" level may be effective at some level. Further, dynamically removing API call components from within services may also be effective. Noting that some dynamic libraries contain a mixture of code, data and resources, each of these could also be removed/added from the O/S based on usage patterns.

While various aspects of the present disclosure have been described above, it should be understood that they have been presented by way of example and not limitation. It will be apparent to persons skilled in the relevant art(s) that various changes in form and detail can be made therein without departing from the spirit and scope of the present disclosure. Thus, the present disclosure should not be limited by any of the above described exemplary aspects, but should be defined only in accordance with the following claims and their equivalents.

In addition, it should be understood that the figures in the attachments, which highlight the structure, methodology, functionality and advantages of the present disclosure, are presented for example purposes only. The present disclosure is sufficiently flexible and configurable, such that it may be implemented in ways other than that shown in the accompanying figures (e.g., implementation within operating systems and computing devices other than those mentioned herein for illustration purposes).

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

What is claimed is:

1. A system for facilitating dynamic addition and removal of operating system components on a computing device, comprising:
 a processor;
 a first application programming interface (API) intercept layer that is executable by the processor and capable of intercepting an API call from an application executing on the computing device, said API call being intended for a component of the operating system;
 a hydrate engine capable of adding and removing said component of the operating system from the computing device; and
 a rules engine, coupled to said API intercept layer and said hydrate engine, capable of:
  reading information stored by said first API intercept layer, said information related to said API call from said application executing on the computing device; and
  applying at least one hydrate rule, utilizing said information, that is related to a time period said component was last utilized by said application executing on the computing device, and that instructs said hydrate engine to do one of: add said component to the operating system of the computing device; and remove said component from the operating system of the computing device.

2. The system of claim 1, wherein said hydrate engine adds said component to the operating system of the computing device by retrieving said component from one of: a cloud-based service; a storage located on said computing device; and a second computing device coupled to said computing device via a network.

3. The system of claim 1, wherein said at least one hydrate rule applied by said rules engine is further based on a mark and sweep model.

4. The system of claim 1, wherein said first API intercept layer is configured to intercept said API call at a first layer of the operating system.

5. The system of claim 4, further comprising:
 a second API intercept layer capable of intercepting said API call from said application executing on the computing device;
 wherein said second API intercept layer is configured to intercept said API call at a second layer of the operating system.

6. The system of claim 1, wherein said first API intercept layer is configured to intercept said API call from said application executing on the computing device after said API call accesses a shared library file of the operating system.

7. The system of claim 1, wherein the computing device is one of: a desktop; a laptop; a tablet; a notebook; and a mobile telephone.

8. A method for facilitating dynamic addition and removal of operating system components on a computing device, the method executing on a processor of the computing device, comprising the steps:
 (a) intercepting, by a first application programming interface (API) intercept layer, an API call from an application executing on the computing device, said API call being intended for a component of the operating system;
 (b) reading, by a rules engine coupled to said API intercept layer, information stored by said first API intercept layer, said information related to said API call from said application executing on the computing device; and
 (c) applying, by said rules engine, at least one hydrate rule that is related to a time period said component was last utilized by said application executing on the computing device and which utilizes said information to instruct a hydrate engine coupled to said rules engine to do one of: add said component to the operating system of the computing device; and remove said component from the operating system of the computing device.

9. The method of claim 8, wherein said hydrate engine adds said component to the operating system of the computing device by retrieving said component from one of: a cloud-based service; a storage located on said computing device; and a second computing device coupled to said computing device via a network.

10. The method of claim 8, wherein said at least one hydrate rule applied by said rules engine is further based on a mark and sweep model.

11. The method of claim 8, wherein said first API intercept layer is configured to intercept said API call at a first layer of the operating system.

12. The method of claim 11, further comprising the step of:
 (d) intercepting, by a second API intercept layer, said API call from said application executing on the computing device at a second layer of the operating system.

13. The method of claim 8, wherein said first API intercept layer is configured to intercept said API call from said application executing on the computing device after said API call accesses a shared library file of the operating system.

14. The method of claim 8, wherein the computing device is one of: a desktop; a laptop; a tablet; a notebook; and a mobile telephone.

15. A computer program product device comprising a computer usable medium having an operating system and control logic stored thereon for causing a computer to facilitate dynamic addition and removal of operating system components, said control logic comprising:
 first computer readable program code means for causing the computer to intercept, by a first application programming interface (API) intercept layer, an API call from an application executing on the computer, said API call being intended for a component of the operating system;
 second computer readable program code means for causing the computer to read, by a rules engine coupled to said API intercept layer, information stored by said first API intercept layer, said information related to said API call from said application executing on the computer; and
 third computer readable program code means for causing the computer to apply, by said rules engine, at least one hydrate rule that is related to a time period said component was last utilized by said application executing on the computing device and which utilizes said information to instruct a hydrate engine coupled to said rules engine to do one of: add said component to the operating system of the computer; and remove said component from the operating system of the computer.

16. The computer program product device of claim 15, wherein said hydrate engine adds said component to the operating system of the computer by retrieving said component from one of: a cloud-based service; a storage located on said computer; and a computing device coupled to said computer via a network.

17. The computer program product device of claim 15, wherein said at least one hydrate rule applied by said rules engine is further based on a mark and sweep model.

18. The computer program product device of claim 15, wherein said first API intercept layer is configured to intercept said API call at a first layer of the operating system.

19. The computer program product device of claim 18, further comprising:
fourth computer readable program code means for causing the computer to intercept, by a second API intercept layer, said API call from said application executing on the computer at a second layer of the operating system.

20. The computer program product device of claim 15, wherein said first API intercept layer is configured to intercept said API call from said application executing on the computer after said API call accesses a shared library file of the operating system.

* * * * *